United States Patent [19]

Pallares-Martinez et al.

[11] 4,357,285

[45] Nov. 2, 1982

[54] THERMAL REGULATOR FOR FUEL AND AIR TO A CARBURETOR

[76] Inventors: Jose L. Pallares-Martinez; Jose Pallares-Osorio, both of Viveros de Coyoacan No. 5, Viveros de la Loma, Tlalnepantla, State of Mexico, Mexico

[21] Appl. No.: 248,255

[22] Filed: Mar. 27, 1981

[30] Foreign Application Priority Data

Mar. 28, 1980 [MX] Mexico .................................. 181780

[51] Int. Cl.³ ............................................ F02M 31/16
[52] U.S. Cl. ................................. 261/145; 261/69 R; 123/557; 123/552
[58] Field of Search ...................... 261/144, 145, 41 D, 261/69 R, 121 A; 123/549, 557, 546, 552

[56] References Cited

U.S. PATENT DOCUMENTS

| | | | |
|---|---|---|---|
| 2,163,522 | 6/1939 | Wehinger | 123/546 |
| 4,091,782 | 5/1978 | Dunnam | 123/557 |
| 4,112,889 | 9/1978 | Harpman | 123/557 |
| 4,114,566 | 9/1978 | Harpman et al. | 123/552 |
| 4,178,897 | 12/1979 | Strem et al. | 123/557 |
| 4,216,751 | 8/1980 | Davison et al. | 123/557 |
| 4,248,197 | 2/1981 | Davis | 123/557 |

*Primary Examiner*—Tim R. Miles
*Attorney, Agent, or Firm*—Armstrong, Nikaido, Marmelstein & Kubovcik

[57] ABSTRACT

An apparatus for providing fuel of a predetermined temperature and at a predetermined fuel rate based on demand to a carburetor of an internal combustion engine comprising a temperature regulated air flow mixer valve, a cool air inlet to the valve, a warm air inlet to the valve, a thermal balancing chamber connected to the outlet of the valve including a fuel pressure control valve mounted thereon, an expansion chamber mounted on the thermal balancing chamber and a fuel metering valve mounted at the outlet of the thermal expansion chamber. The fuel metering valve is responsive to engine vacuum. The thermally-regulated air flow mixer valve is responsive to the mixture in the intake manifold, and mixes the cool air and warm air to produce a desired temperature in the thermal balancing chamber. The warm air inlet includes a heat exchanger mounted in the exhaust manifold of the engine for warming intake air.

9 Claims, 4 Drawing Figures

THERMAL REGULATOR FOR FUEL AND AIR TO A CARBURETOR

BACKGROUND OF THE INVENTION

1. Field of the Invention

The present invention is related to improvements in carburation systems and, more particularly, to a thermal regulator for a carburetor which appropriately regulates temperature, pressure and amounts of air and the gasoline to be fed to a carburetor.

2. Description of the Prior Art

Because it is a mixture of various components, gasoline does not have a fixed point of boiling, but rather a curve of distillation temperatures that starts at 30° C. and ends normally before the 200° C. Its specific weight varies between 0.700 and 0.790 hg/dm$^3$. The gasoline is used mixed with organic synthetic colors and generally is loaded with additives of sundry kinds.

Certain difficulties are encountered because these properties of gasoline cause variations in performance of an engine depending upon the condition of the engine and environmental conditions. Vaporization or gasification of the gasoline can undesirably occur in the feedlines from the gas tank to the carburetor of the engine. Under differing conditions, the gasoline fed to the carburetor has different temperatures, degrees of vaporization, etc.

The above can lead to various problems, namely, incomplete combustion resulting in deposits in the engine and environmental pollution, incomplete vaporization at the carburetor resulting in power loss or cold start flooding and the like.

In order to overcome the above problems, various improvements have been developed in the carburetor art. These primarily have been directed to closer regulation of the mixing of the gasoline with air in the carburetor with mixture adjustments being made for engine speed and fuel demand. Generally, carburetion has not previously been adjusted for changes in temperature and performance of the engine itself under differing environmental conditions. Consequently, close control of the emulsion of gasoline and air has not yet been achieved. Absent such control, pollution and possible damage to the engine can result.

OBJECTS AND SUMMARY OF THE INVENTION

The present invention has as an object to provide an apparatus which can be added to a carburetion system which adjusts the fuel and air emulsion fed to the engine depending upon the temperature changes of the running engine.

It is a further object to provide an apparatus which can easily be added to a conventional carburetor to reduce emissions of pollution and increase the performance of the engine.

It is still another object to provide an apparatus that adjusts the formation of the mixture of air and fuel according to the differing temperatures and conditions of driving experienced by the engine.

These and other objects which will be readily apparent to those skilled in the art are attached in an apparatus for providing fuel of a predetermined temperature and at a predetermined fuel rate based upon demand to a carburetor of an internal combustion engine comprising a temperature-regulated air flow mixer valve having means for sensing temperature of the interior of the intake manifold and operating the valve accordingly, cool air inlet means connected to an inlet of the air mixer valve, warm air inlet means connected to another inlet of the air mixer valve having means associated with the exhaust manifold for warming air, a thermal balancing chamber connected to the outlet of the air mixer valve including a fuel pressure control valve, means on the chamber for providing elastic expansion space for the fuel in the chamber, and means mounted at the outlet of the chamber responsive to engine vacuum for metering fuel flow to the carburetor based on demand.

The air flow mixer valve can comprise a cylindrical body having two ends, a central axial bore, a pair of inlet bores on one side of the body perpendicular to the axial bore and intersecting on a side of the axial bore away from the one side, and an outlet bore in the body joining the intersection of the inlet bore, a shaft rotatably mounted in the axial bore and extending beyond the two ends, the shaft having a pair of orifices therethrough at positions where the pair of inlet bores cross the axial bore, and limit means on one end of the shaft for limiting the rotational travel of the shaft. The means for sensing temperature of the interior of the intake manifold is mounted on the other end of the shaft opposite the end having the limit means.

The means for sensing temperature can comprise a bimetallic coil extending into the intake manifold.

The cool air inlet means can include a diffusor having a first conical portion, a cylindrical portion and a second conical portion with an air filter mounted adjacent the first conical portion, an air fan in the cylindrical portion and a conduit connecting the second conical portion to the inlet of the air flow mixer valve.

The means for warming air can comprise a heat exchanger mounted in the exhaust manifold.

The spiral tube in the thermal balancing chamber can have radially extending pins thereon extending into the interior of that chamber.

The means for providing elastic expansion space can comprise a cylindrical body having an open interior and a passage open to the interior of the thermal balancing chamber, and a piston displaceably positioned in that open interior.

The means for metering fuel flow can comprise a base, a diaphragm dividing the interior of the base into a first portion and a second portion, a spring in the second portion biasing the diaphragm in a first direction, a first conduit connected between the second portion and a source of engine vacuum, an extension portion of the first portion having a hollow bore extending into the thermal balancing chamber, a valve seat at an end of the extension portion adjacent the thermal balancing chamber, a needle valve attached to the diaphragm having a hollow stem, an open end and a cross-passage, and a fuel outlet connected to the extension portion adjacent the cross-passage of the needle valve. The needle valve extends into the extension portion and is seatable on the valve seat.

The apparatus can further comprise a compensatory fuel expansion chamber provided adjacent the fuel tank comprising a storage cylinder, a displaceable piston in the storage cylinder a first conduit connected to the fuel tank and a second overflow conduit connected to an inlet of a fuel pump.

The present invention can be used in any type of internal combustion engine having reciprocating pistons and also in certain types of turbines. Fuels other than gasoline, such as diesel kerosene, L.P. and others with a mixture of alcohol or additives can also be used.

The present invention provides improvements for the operation of the carburetors described and covered by Mexican Pat. Nos. 52,438 and 134,217, Mexican application number 166,631 and U.S. application Ser. No. 71,722, now abandoned.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
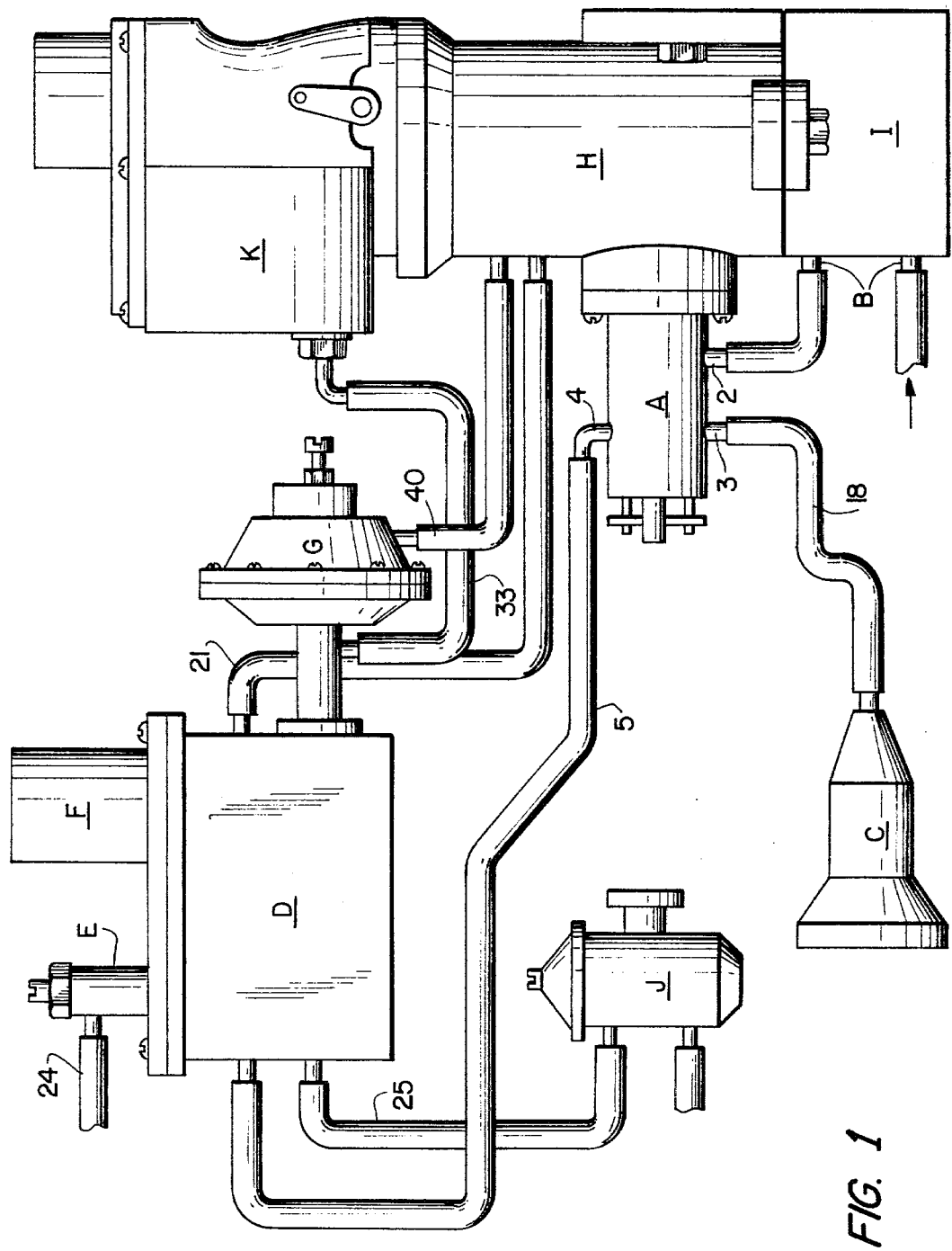
FIG. 1 is a diagrammatic view of the component parts of the present invention.
Figure 2:
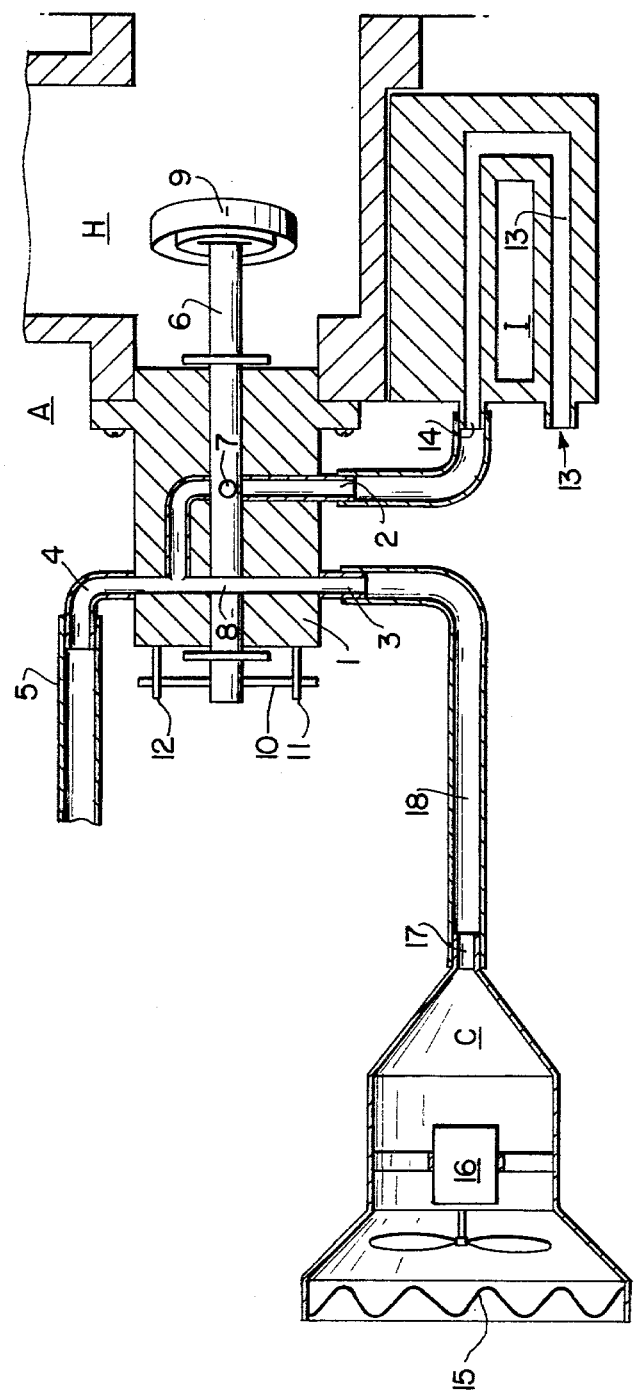
FIG. 2 is a partial cross-sectional view of the air flow mixer valve, the cool air inlet means and the warm air inlet means of the present invention.
Figure 3:
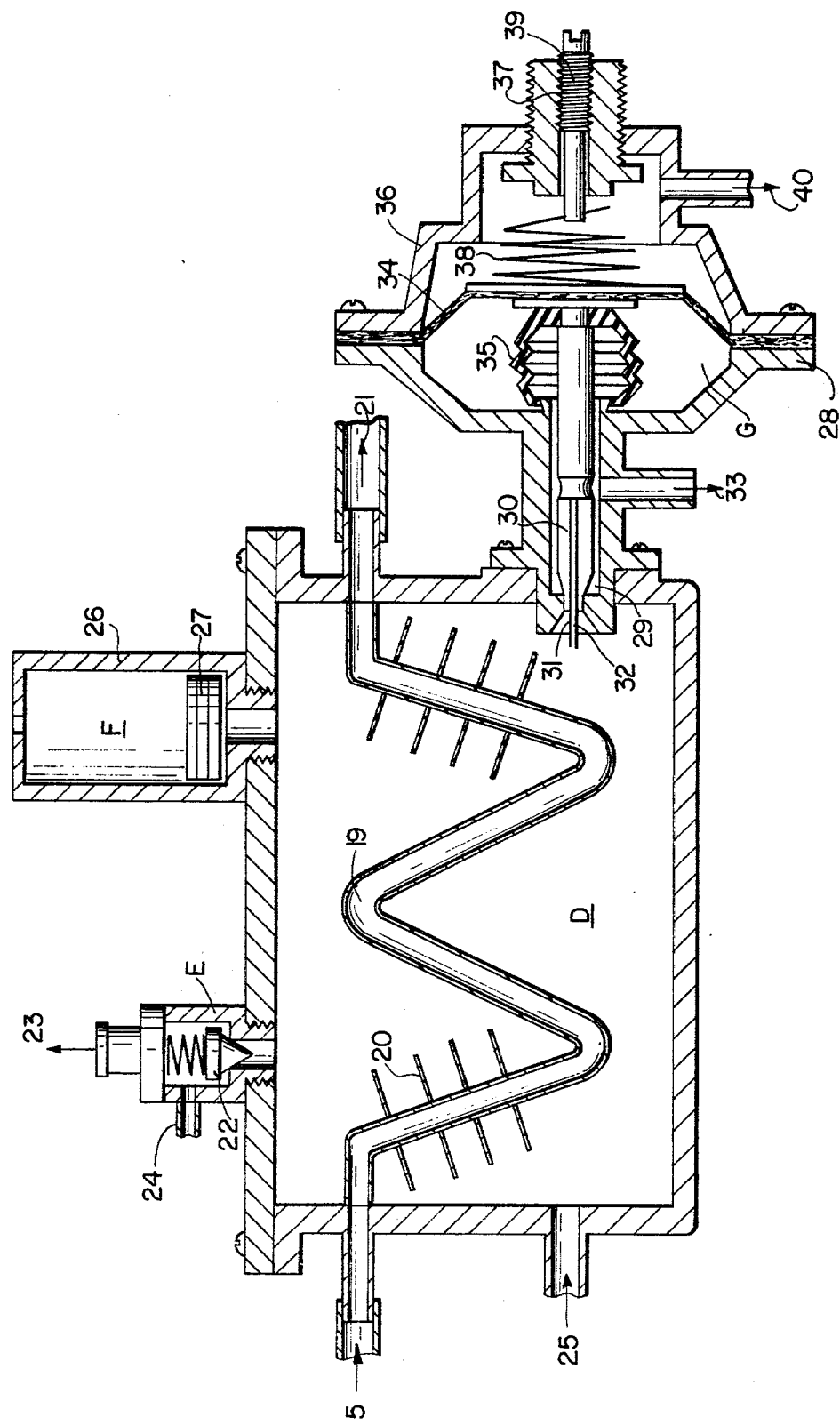
FIG. 3 is a partial cross-sectional view of the thermal balancing chamber and the means responsive to engine vacuum for metering fuel flow of the present invention.
Figure 4:
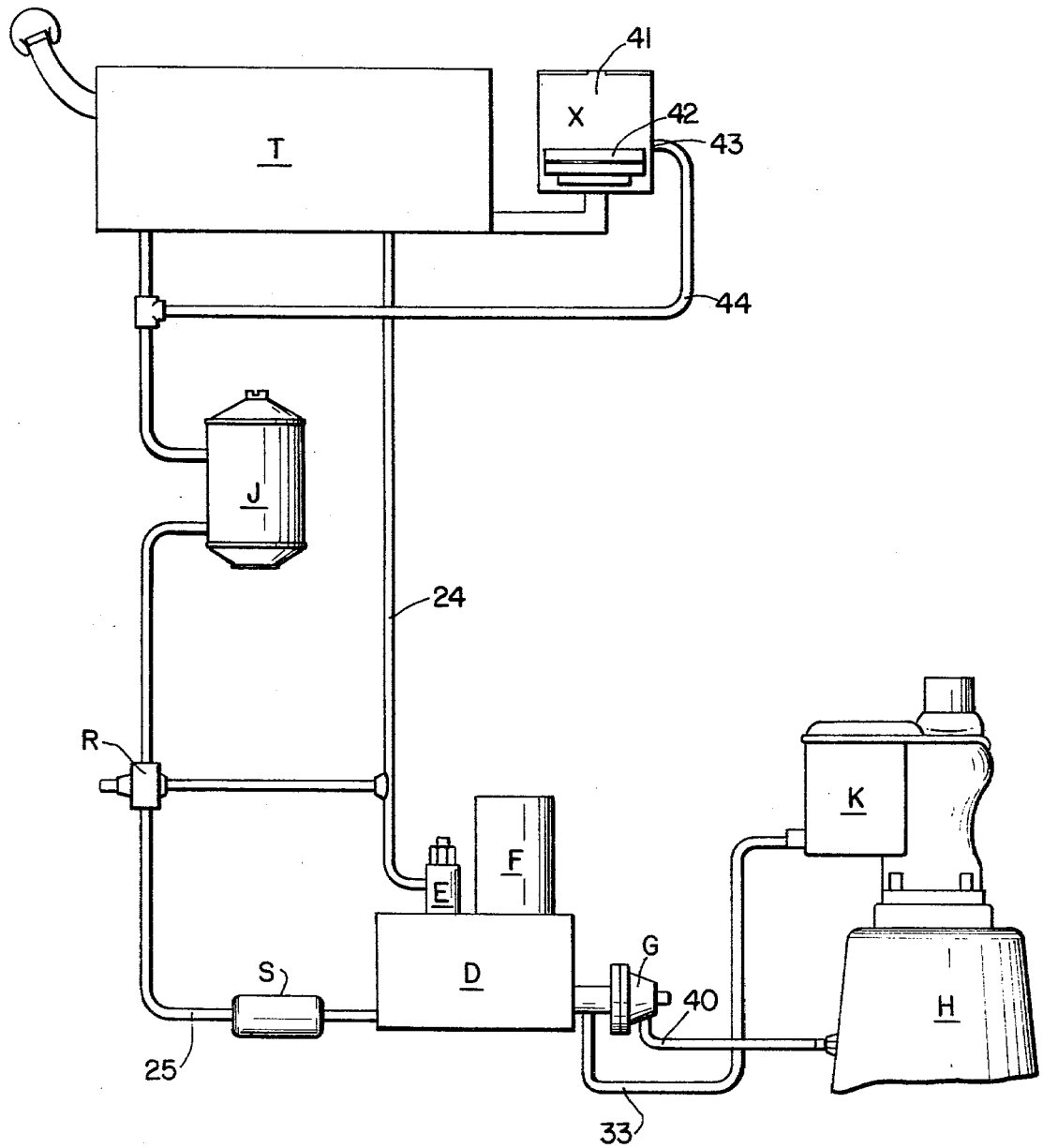
FIG. 4 is a schematic view of the positioning of the components of FIG. 3 in a fuel flow system.

The temperature-regulated air flow mixer valve A as shown in FIGS. 1 and 2 is attached to the intake manifold of the engine. It comprises a cylindrical body 1 having a warm air inlet 2 and a cool air inlet 3. A mixed air outlet 4 passes the mixed air to the thermal balancing chamber D through the pipe 5. The warm or cool air distribution is proportioned by the shaft 6, which is provided with a graduated orifice 7 specifically for the metering of warm air and graduated orifice 8 for the metering of cool air that comes from the cool air diffusor C. The shaft 6 is operated by a bimetallic sensor or operating coil 9 that has a great sensitiveness to the temperature changes in the interior of the inlet H to the intake manifold and has the function of measuring the temperature therein. As the sensor or bimetallic coil 9 is heated or cooled by the mixture in the inlet H, it expands or contracts and rotates. This rotation turns the shaft 6, thus metering the relative amounts of warm and cool air passing through the orifices 7 and 8. At the opposite end of the shaft 6 from the sensor 9, a perpendicular shaft 10 is provided that has the function of stopping the angular movement of the valve in angular displacement and is limited by settable stops 11 and 12 in order to control the temperature or the moment in which the orifices 7, 8 of warm or cool air must open.

It is of great importance that the sensor 9 be set up in the inlet H as the temperature of it influences the volatility of the fuel mixture.

The means for warming air or air heater B is set up in the exhaust manifold of the engine in order to obtain heat which would otherwise be wasted. The air is taken from the air filter of the carburetor through the inlet 13 and is heated as it passes to the air flow mixer valve A through the outlet 14.

The cool-air inlet means or diffusor C is set up in the front of the vehicle far away from the higher temperature areas of the engine for the purpose of taking the most cool air possible. The cool air inlet means C provides, as hereinafter described, air for cooling the fuel when the temperature of the mixture in the inlet H is above 68° C. The temperature in the inlet H should be adjusted to a range of from 65° to 75° C. This can be difficult because the intake manifold, being right next to the engine body and being able to readily transfer heat therefrom, can get hot. This heating would tend to expand the gaseous mixture therein which would result in a lean, poor charge to the cylinders. The air diffusor C is a graduated conical container having therein, in the wider front part, a removable purifier filter 15 and, in the middle cylindrical part, a micro-electric fan 16. The fan 16 is optional and is desirable especially for use of the vehicle in very hot areas. This fan can be thermostatically controlled and is provided for forcing additional air to the air flow mixer valve A. The cool air flows through the pipe 17 and is sent to the cool air inlet 3 of the air flow mixer valve A. The valve A is generally positioned between the fuel pump J and the carburetor or fuel injector K.

The thermal balancing chamber D has therein a metallic spiral tube 19 of a highly thermally conductive material for heating or cooling the fuel in the chamber D, which is fed therefrom to the carburetor. The thermal balancing chamber D is provided to adjust the temperatures of the fuel and the air to be equal. Additionally, it serves to warm the fuel to the proper degree of volatility for uniform vaporization in the carburetor or injectors K. The spiral tube 19 has radial fins or discs 20.

The heat of the air that passes through the spiral tube 19 is received from the air flow mixer valve A through the pipe 5 and is sent to the inlet H of the intake manifold by means of the pipe 21, thus the suction in the inlet H pulls the air through the spiral tube 19.

A fuel pressure control valve E is mounted on the thermal balancing chamber D. The valve E is provided in its inside a needle or ball 22 controlled by a regulator 23 to control the maximum pressure of fuel in the chamber D, when it is warm in such a way that, when there is an overpressure in the chamber, excess fuel is sent back to the vehicle tank through the return pipe 24. The fuel that is fed to the chamber D arrives from the fuel pump J through the pipe 25.

The means for providing elastic expansion space or expansion compensatory chamber F comprises a cylindrical body 25 having a displaceable piston 27 therein in order to store there the fuel that is in a state of molecular expansion. It also serves as a temporary reservoir of fuel at the proper temperature in case of a sudden surge demand for fuel. Without such expansion chamber, a surge demand could result in fuel that has not yet come up to temperature reaching the carburetor or injectors K. The cylinder 26 has a storage capacity of approximately 20% of the volume contained in the thermal balancing chamber D.

Means responsive to engine vacuum for metering fuel or fuel metering valve G is a unit that is mounted at the outlet orifice of fuel of the thermal balancing chamber D. The metering valve G comprises a base 28 having a valve seat 29 for the graduated needle 30. The needle 30 has a conical point 31 and a bypass orifice 32. The metered fuel is sent to the carburetor through the discharge pipe 33. At the opposite end of the needle 30, there is coupled a diaphragm or membrane 34 and flexible bellows protector 35. A screw regulator 39 is provided in the cover 36 for regulating the needle 30. The engine suction that moves the diaphragm 34 arrives from pipe 40. A compensatory fuel molecular expansion chamber X can be provided of the fuel tank T of the vehicle. The chamber X comprises a storage cylinder 41 and a displacement piston 42 therein. It is of a great importance that chamber X be provided in all fuel tanks since it contributes notably to the total control of the molecular expansion that is a characteristic of the gasoline in its tendency to vaporize from the very instant that the fuel tank T is filled up. Generally, volumetric expansion and vaporization of fuel in a fuel tank is accommodated by either releasing the vapors to atmosphere which is undesirable, or by piping these vapors to the carburetor. Passing of this material to the carburetor can result in upset of the fuel-air mixture balance. A too-rich mixture could result. Thus, the present invention utilizes the compensatory fuel molecular expansion tank X at the fuel tank in place of these prior art systems. Any overfill of the chamber above 43 flows to line 44 to the fuel pump J.

When the engine is started, there does not exist enough air in inlet H such that the carburetor sees proper suction. Furthermore, in this instance, the gasoline is in a still state. The situation is particularly delicate when cold-starting is performed. The engine does not have the proper temperature as to favor the evaporation of the fuel. When low temperatures are present, the fuel has a greater tendency to remain as drops that are not mixed with air that can be deposited in the cold places of the intake manifold and, consequently, in the cylinders.

The majority of the carburetion systems overcome this problem by utilizing a choke to create a richer mixture. This produces negative collateral effects because, when the choke is used, a certain amount of the gasoline passes to the oil in the crankcase with subsequent lubrication dilution, the excessive fuel is consumed and the excessive pollutant gasses are emitted.

The present invention avoids these problems since the means for warming air B is present directly in the exhaust manifold, it is heated almost instantly. The thermally regulated air flow mixer valve A is totally open to the warm air orifice 7, thereby immediately conditioning the fuel and air entering the carburetor or injector K.

While the engine reaches the regime temperature, simultaneously the nominal pressure of 1.3 kilograms of the fuel that prevails in the balancing chamber D shall increase because the effects of temperature transference of the spiral tube 19 produces the molecular expansion phenomenon of the fuel that flows through the chamber D (until it reaches 2.2 kilograms of regime pressure). There has been provided to the thermal balance chamber D a fuel pressure valve E and a compensatory chamber F, which operate in the following way:

The pressure valve E, by means of the regulator 23, determines the maximum pressure (for example, 2.30 kilograms) in the heated thermal balance chamber D and the product of over-pressurization is turned back to the tank T through the return pipe 24. In this way, the valve E works only when the regime pressure is 2.2 kilograms because of excess of temperature or for any defect in the compensatory chamber F. The following problems are avoided: the overpressure that can damage the chamber D is eliminated. The good functioning of the compensatory chamber F is assured. The possibility of the presence of phenomenon of fuel gassification is eliminated. The carburetor K functions without overcharges of the mixture on account of an excess of pressure.

In the majority of actual carburetion systems, when the engine functions at the idle speed, the butterfly valve of the carburetor is almost closed. This results in a very small air suction and, therefore, the vaporization of the gasoline is very limited. It happens the same when the temperature is very high and the gassification phenomenon of the gasoline may be present in the interior of the carburetor body. The thermal balance chamber prevents these problems by being a reservoir of standard temperature fuel and air.

During the conditioning process of the fuel temperature contained in the chamber D, there is produced an increase in volume of the gasoline that has to be controlled. The specific control of this phenomenon is achieved by the expansion chamber F. The fuel pump J keeps the chamber D full, the specific weight of the piston 27 has been calculated to maintain the gravity absolutely quiet inside the cylinder 26 invariably when the pressure does not overcome 1.3608 kilograms. In this way, the beginning of the regulating process changes the nominal pressure of 1.36 kilograms to an operating pressure of 2.2680 kilograms. The molecular expansion of the fuel on account of the increase of temperature is stored little by little in the compensatory chamber F by the displacement of the piston 27. This avoids the possible gassification of the gasoline in the carburetor chamber because the temperature of the gasoline is graduated in accordance with the engine temperature.

The present invention provides its greatest benefit in the thermal regulation of the air and fuel being passed to the carburetor. This provides for a uniform mixture with uniform characteristics during the different running conditions of the engine in differring environments. The air flow mixer valve A, with a resistance bimetallic coil 9 that is introduced in the inside of the inlet H with the object of detecting the reigning temperature in the stream of air suctioned by the engine, controls the opening and closing of the warm air orifice 7 and cool air orifice 8. If the temperature in the inside of the inlet is very low, for example, 16° C., the warm air orifice 7 shall be completely open and will close in accordance with an increase of the temperature, for example, at 65° C. In this instance, the cool air orifice 8 begins to open so that if the temperature increases excessively, for example, to 75° C., the warm air orifice will be completely closed and the cool air orifice shall be completely opened. The warm air is taken from the warm air heater B set up in the exhaust manifold I and the cool air is tekan from the cold air diffusor C. The diffusor is installed in the front of the vehicle with the purpose of obtaining the coolest air possible. Nevertheless if, in hot regions, the cool air would be insufficient, it can be helped by a micro-fan 16 especially installed in the inside of the diffusor C. Finally a filter is installed in the wider part of the diffuser to avoid the dust passing jointly with cool air and damage to the valve A or the inside parts of the engine.

It is readily apparent that the above-described thermal regulator for fuel and air to a carburetor meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention, wherein:

What is claimed is:

1. An apparatus for providing fuel of a predetermined temperature and at a predetermined feed rate based on demand to a carburetor of an internal combustion engine comprising:
   a temperature-regulated air flow mixer valve having two inlets, one outlet and means for sensing temperature of the interior of an intake manifold of the engine and operating the valve accordingly;
   cool air inlet means connected to one of said inlets of said valve;
   warm air inlet means connected to the other of said inlets of said valve having means associated with an exhaust manifold of the engine for warming air;
   a thermal balancing chamber having a tube passing therethrough connected to said outlet of said mixer valve, a fuel inlet, a fuel outlet and a fuel pressure control valve mounted thereon and connected to a fuel tank;
   means mounted on said chamber for providing elastic expansion space for fuel in said chamber; and
   means mounted at said outlet of said chamber responsive to engine vacuum for metering fuel flow to the carburetor based on demand.

2. The apparatus of claim 1 wherein:
   the air flow mixer valve comprises:
   a cylindrical body having two ends,
   a central axial bore;
   a pair of inlet bores in one side of said body perpendicular to said axial bore and intersecting in said bore on a side of said axial bore away from said one side; and
   an outlet bore in said body joining the intersection of said inlet bores;
   a shaft rotatably mounted in said axial bore and extending beyond said two ends, said shaft having a pair of orifices therethrough at positions where said pair of inlet bores cross said axial bore;
   limit means on one end of said shaft for limiting rotational travel of said shaft; and
   said means for sensing temperature of the interior of the intake manifold being mounted on the end of the shaft opposite the end having the limit means.

3. The apparatus of claim 2 wherein the means for sensing temperature comprises a bimetallic coil extending into said intake manifold.

4. The apparatus of claim 2 wherein the cool air inlet means includes a diffusor having a first conical portion, a cylindrical portion and a second conical portion; an air filter mounted adjacent said first conical portion; an air fan in said cylindrical portion; and a conduit connecting the second conical portion to the inlet of the air flow mixer valve.

5. The apparatus of claim 2 wherein the means for warming air comprises a heat exchanger mounted in the exhaust manifold.

6. The apparatus of claim 2 wherein said tube has radially extending fins thereon extending into the interior of said thermal balancing chamber.

7. The apparatus of claim 2 wherein the means for providing elastic expansion space comprises a cylindrical body having an open interior and a passage open to the interior of the thermal balancing chamber, and a piston displaceably positioned in said open interior.

8. The apparatus of claim 2 wherein the means for metering fuel flow comprises a base, a diaphragm dividing the interior of the base into a first portion and a second portion, a spring in said second portion biasing said diaphragm in a first direction, a first conduit connected between said second portion and a source of engine vacuum, an extension portion of said first portion having a hollow bore extending into said thermal balancing chamber, a valve seat at an end of said extension portion adjacent said thermal balancing chamber, a needle valve attached to said diaphragm having a hollow stem, an open end and a cross-passage, said needle valve extending into said extension portion and seatable on said valve seat and a fuel outlet connected to said extension portion adjacent said cross-passage of said needle valve.

9. The apparatus of claim 2 further comprising a compensatory fuel expansion chamber provided adjacent the fuel tank comprising a storage cylinder, a displaceable piston in said storage cylinder, a first conduit connected to said fuel tank and a second overflow conduit connected to an inlet of a fuel pump.

* * * * *